J. P. URBANEK.
FAUCET.
APPLICATION FILED AUG. 26, 1907.
931,528.
Patented Aug. 17, 1909.
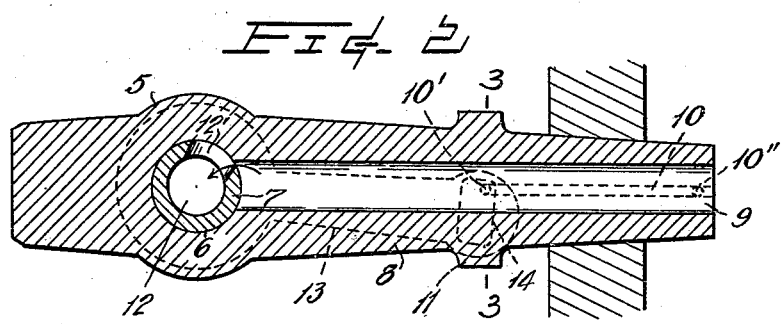
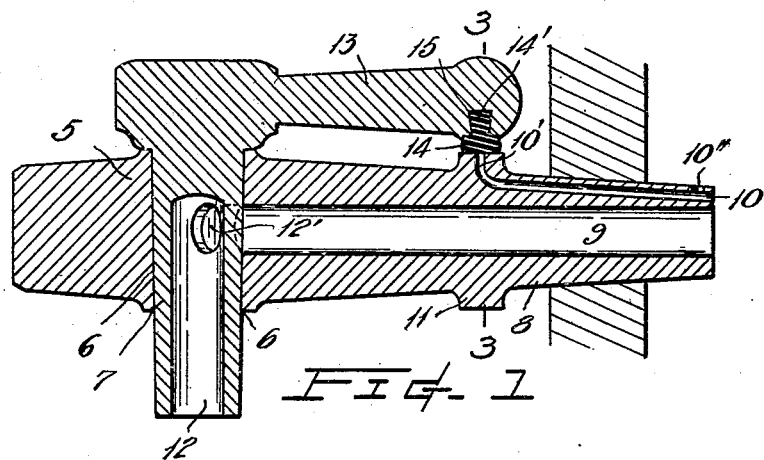
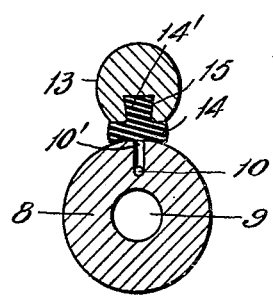
WITNESSES.
Horace Barnes
Lester M. Young
INVENTOR:
John P. Urbanek
BY
Pierre Barnes
ATTORNEY

UNITED STATES PATENT OFFICE.

JOHN P. URBANEK, OF SEATTLE, WASHINGTON.

FAUCET.

No. 931,528.        Specification of Letters Patent.        Patented Aug. 17, 1909.

Application filed August 26, 1907. Serial No. 390,208.

*To all whom it may concern:*

Be it known that I, JOHN P. URBANEK, a citizen of the United States, residing at Seattle, in the county of King and State of Washington, have invented certain new and useful Improvements in Faucets, of which the following is a specification, reference being had therein to the accompanying drawings.

This invention relates to faucets and, more especially, to such as are employed with casks or other closed vessels containing vinous or other fermentable liquids.

The object of the invention is the provision in a faucet of a vent which is opened or closed coincidently with the opening or closing of the faucet. I attain this result by the novel construction, arrangement and combination of the various parts, as will be hereinafter set forth, reference being had to the accompanying drawings, wherein—

Figure 1 is a vertical longitudinal section of a faucet embodying the present invention; Fig. 2, a horizontal longitudinal section of the same; and Fig. 3, a cross section through 3—3 of the preceding views.

The faucet is comprised of a body having a head 5 with a bore, or chamber, 6 to accommodate the spigot 7, and a shank 8 which is provided with an axially disposed liquid-conduit 9 extending from the shank extremity to the aforesaid chamber. The body is likewise provided at its top with a longitudinally arranged air-duct 10 which extends from said extremity to an opening 10' positioned intermediate the length of the body, while adjacent to the other end of the duct is a branch 10'' thereof. This branch and the opening 10' are directed upwardly, the latter terminating in the periphery of a collar 11 formed upon the shank. The spigot 7, as herein illustrated is of the plug type and, as common, is provided with a spout opening 12 having a branch opening 12' in the same vertical plane with the conduit 9 in order that it may be brought into or out of communication therewith when the liquid is to be withdrawn through the spigot spout. This function is accomplished by properly rotating the spigot through the medium of a lever-handle 13 formed or rigidly connected thereto. This handle is of a length sufficient to extend over the duct opening 10' and has upon its underside a valve member 14 of rubber or other equivalent yielding material. Said member may be connected to the handle in any suitable manner, as by providing it with a stem 14' which is held within a recess 15 in the handle by the resilient character of the material and, to make the attachment more reliable, such recess is desirably made of a dove-tail shape as shown.

The spigot opening 12' is so arranged with relation to the handle, or to the valve member 14, that communication is had between the spigot spout and the liquid conduit, in opening the faucet, before the handle has been swung sufficiently far to remove said member from the duct opening 10' and also, in closing the faucet, that the duct opening is closed prior to the complete closing of the faucet.

The operation of the invention will, it is believed, be understood from the foregoing description. It is to be noted, however, that the vent, or air duct, is opened or closed without any attention upon the part of the operator other than is required to correspondingly manipulate the faucet. When the faucet is opened air is admitted through the vent to replace the liquid as the latter is withdrawn and thus facilitates the efficiency of the faucet proper; when the faucet is closed the inflow of air is prevented by the valve member closing the vent and accordingly reduces the loss of the liquid within the vessel to a minimum through evaporation or fermentation.

The air duct is capable of being readily cleaned of obstruction by introducing a wire therethrough and, by reason of the spigot being opened earlier than the duct, the inflow of air through the latter is assured.

What I claim, is—

A faucet comprising a body portion embodying a head and a shank, said head having a vertical bore and said shank having a conduit extending at right angles with respect to and communicating with the said bore, said shank further provided at a point intermediate its ends with an exterior boss constituting a flat valve seat and said shank further having a longitudinally-disposed air duct in the wall thereof opening at its inner end at the inner end of the shank and at its outer end extending upwardly through said boss, said shank further provided with a lateral passage at a point intermediate the boss and the inner end of the shank, said lateral passage communicating with said air duct, a spigot positioned in said bore and provided with a port whereby communication is established between said duct and the interior of the spigot, a handle carried by the spigot and having an enlarged free end and a resilient element comprising a shank and a head, said shank secured in the enlarged end of the handle and said head abutting against the lower face of the enlarged end of the handle, said head being cylindrical in contour and constituting a valve adapted to engage said flat seat and to close the air duct.

In testimony whereof I affix my signature in presence of two witnesses.

JOHN P. URBANEK.

Witnesses:
PIERRE BARNES,
ROBT. B. GILLIES.